United States Patent
Seybold

(10) Patent No.: US 10,311,339 B2
(45) Date of Patent: Jun. 4, 2019

(54) UNSUPERVISED LEARNING TECHNIQUES FOR TEMPORAL DIFFERENCE MODELS

(71) Applicant: Google Inc., Mountain View, CA (US)

(72) Inventor: Bryan Andrew Seybold, San Francisco, CA (US)

(73) Assignee: Google LLC, Mountain View, CA (US)

(*) Notice: Subject to any disclaimer, the term of this patent is extended or adjusted under 35 U.S.C. 154(b) by 263 days.

(21) Appl. No.: 15/432,045

(22) Filed: Feb. 14, 2017

(65) Prior Publication Data
US 2018/0232604 A1    Aug. 16, 2018

(51) Int. Cl.
| | |
|---|---|
| *G06K 9/00* | (2006.01) |
| *G06K 9/62* | (2006.01) |
| *G06N 3/04* | (2006.01) |
| *G06N 3/08* | (2006.01) |

(52) U.S. Cl.
CPC ........... *G06K 9/6269* (2013.01); *G06N 3/049* (2013.01); *G06N 3/0454* (2013.01); *G06N 3/088* (2013.01); *G06K 9/00* (2013.01)

(58) Field of Classification Search
CPC ........ G06K 9/6269; G06K 9/00; G06N 3/088; G06N 3/0454; G06N 3/049
See application file for complete search history.

(56) References Cited

U.S. PATENT DOCUMENTS

| | | | |
|---|---|---|---|
| 5,659,667 A * | 8/1997 | Buescher ............. | G05B 13/027 706/23 |
| 2010/0220790 A1* | 9/2010 | Jeon ....................... | H04N 19/55 375/240.16 |
| 2014/0058988 A1* | 2/2014 | Lai ........................ | G06N 3/02 706/14 |

(Continued)

FOREIGN PATENT DOCUMENTS

WO    WO 2015/148189    10/2015

OTHER PUBLICATIONS

Cheng et al., "Temporal Sequence Modeling for Video Event Detection", 2014 IEEE Conference on Computer Vision and Pattern Recognition, Columbus, Ohio, Jun. 23-28, 2014, 8 pages.
Doersch et al., "Unsupervised Visual Representation Learning by Context prediction", arXiv preprint arXiv:1505.05192, 2015 International Conference on Computer Vision, Santiago, Chile, Dec. 11-18, 2015, 9 pages.
El-Haija et al, "YouTube-8M: A Large-Scale Video Classification Benchmark", arXiv:1609.08675v1, Sep. 27, 2016, 10 pages.

(Continued)

*Primary Examiner* — Wesley J Tucker
(74) *Attorney, Agent, or Firm* — Dority & Manning, P.A.

(57) ABSTRACT

A temporal difference model can be trained to receive at least a first state representation and a second state representation that respectively describe a state of an object at two different times and, in response, output a temporal difference representation that encodes changes in the object between the two different times. To train the model, the temporal difference model can be combined with a prediction model that, given the temporal difference representation and the first state representation, seeks to predict or otherwise reconstruct the second state representation. The temporal difference model can be trained on a loss value that represents a difference between the second state representation and the prediction of the second state representation. In such fashion, unlabeled data can be used to train the temporal difference model to provide a temporal difference representation. The present disclosure further provides example uses for such temporal difference models once trained.

20 Claims, 7 Drawing Sheets

(56) References Cited

U.S. PATENT DOCUMENTS

| | | | | |
|---|---|---|---|---|
| 2015/0178620 | A1* | 6/2015 | Ascari | G06N 3/049 706/21 |
| 2017/0061283 | A1* | 3/2017 | Rasmussen | G06N 3/0454 |
| 2018/0101768 | A1* | 4/2018 | Laine | G06N 3/08 |
| 2018/0328967 | A1* | 11/2018 | Lange | G01R 21/133 |

OTHER PUBLICATIONS

Karpathy et al., "Large-Scale Video Classification with Convolutional Neural Networks", 2014 IEEE Conference on Computer Vision and Pattern Recognition, Columbus, Ohio, Jun. 23-28, 2014, 8 pages.

Vondrick et al., "Anticipating the Future by Watching Unlabeled Video", arXiv preprint arXiv: 1504.08023, 29th IEEE Conference or Computer Vision and Pattern Recognition, Las Vegas, Nevada, Jun. 26-Jul. 1, 2016, 9 pages.

Wang et al., "Actions ~ Transformations", 29th IEEE Conference on Computer Vision and Pattern Recognition, Las Vegas, Nevada, Jun. 26-Jul. 1, 2016, 10 pages.

Wang et al., "Unsupervised Learning of Visual Representations using Videos", arXiv preprint arXiv:1505.00687, 2015 IEEE International Conference on Computer Vision, Dec. 7-13, 2015, 10 pages.

Yen et al., "A Data-Driven Approach for Event Prediction", 11th European Conference on Computer Vision, Crete, Greece, Sep. 5-11, 2010, pp. 707-720.

Agrawal et al., "Learning to Poke by Poking: Experiential Learning of Intuitive Physics", arXiv:1606.07419v1, Jan. 23, 2016, 12 pages.

International Search Report for PCT/US2017/056127 dated Jan. 25, 2018, 13 pages.

Luo et al., "Unsupervised Learning of Long-Term Motion Dynamics for Videos", arXiv:1701.01821v2, Jan. 10, 2017, 10 pages.

Veeriah et al., "Differential Recurrent Neural Networks for Action Recognition", Institute of Electrical and Electronics Engineers Conference on Computer Vision, Santiago, Chile, Dec. 7-13, 2015, pp. 4041-4049.

Yeung et al., "End-to-end Learning of Action Detection from Frame Glimpses in Videos", Institute of Electrical and Electronics Engineers Conference on Computer Vision and Pattern Recognition, Seattle, Washington, Jun. 27-30, 2016, pp. 2678-2687.

Agrawal et al., "Learning to Poke by Poking: Experiential Learning of Intuitive Physics", arXiv:1606.07419v1, Jan. 23, 2016, 6 pages.

Luo et al., "Unsupervised Learning of Long-Term Motion Dynamics for Videos", arXiv:1701.01821v2, Jan. 10, 2017, 5 pages.

Yeung et al., "End-to-end Learning of Action Detection from Frame Glimpses in Videos", Institute of Electrical and Electronics Engineers Conference on Computer Vision and Pattern Recognition, Seattle, Washington, Jun. 27-30, 2016, 10 pages.

\* cited by examiner

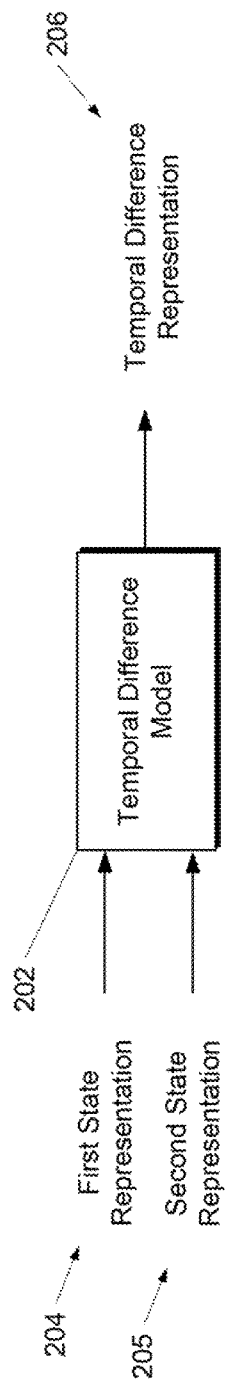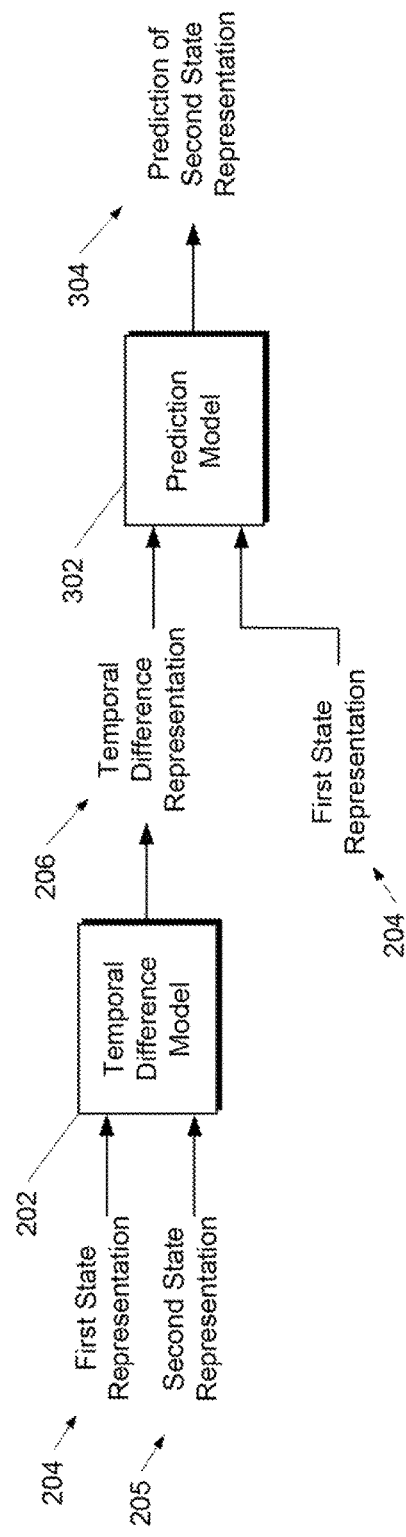
Figure 2
Figure 3

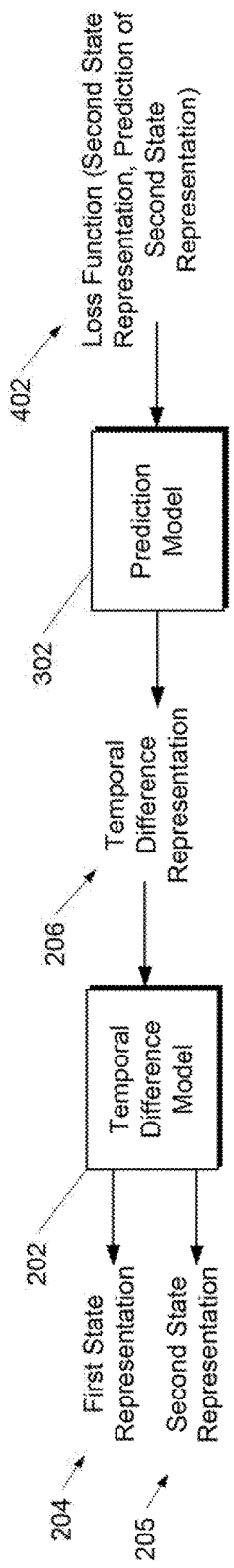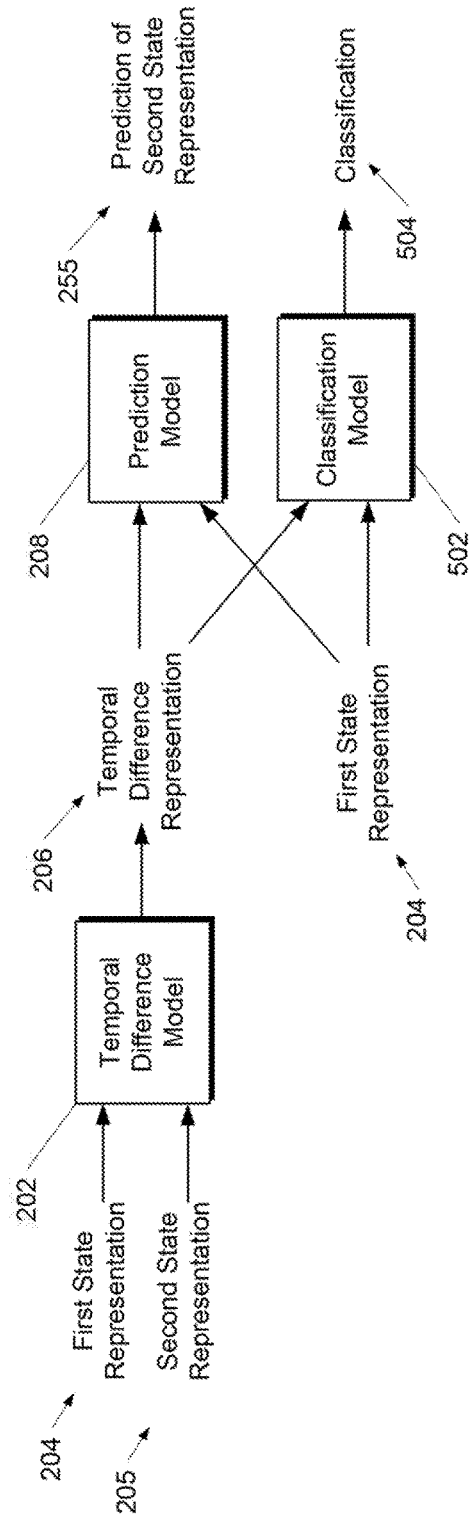

UNSUPERVISED LEARNING TECHNIQUES FOR TEMPORAL DIFFERENCE MODELS

FIELD

The present disclosure relates generally to machine learning. More particularly, the present disclosure relates to unsupervised learning techniques for temporal difference models.

BACKGROUND

Machine learning generally refers to a field of computer science that is focused on enabling machines such as computers to learn without being explicitly programmed. Machine learning includes the study and construction of machine-performed algorithms or techniques that enable machines to learn from and make predictions on data. In particular, such algorithms can operate by building a model from a training set of input observations in order to make data-driven predictions or decisions expressed as outputs, rather than following strictly static programming instructions.

One main branch of machine learning techniques includes supervised learning techniques. Supervised learning can include inferring or learning a function or model from a training data set that includes a number of labeled examples. For example, each example in the training data set can include one or more input values (which can be expressed as a vector with a number of features) and one or more desired output values (which can also be called supervisory signals). Typically, supervised training data is labeled using known ground truth information that provides the input values and the output values. A supervised machine learning algorithm can analyze the training data and produce an inferred model, which can then be used for mapping or making predictions on new, unlabeled examples.

However, in many scenarios, labeled data and/or ground truth data can be difficult and/or costly to obtain. For example, manual labeling of data can require a human to determine and provide a large amount of labels to an enormous number of training examples, which can require an inordinate amount of time and expense. In addition, providing manual labels can be conceptually challenging as the human labeler(s) can be required to agree ahead of time exactly what labels are available for use. Even assuming agreement on the vocabulary of available labels, labelers may not agree on which label to apply or how or when to apply the label to a given training example. Thus, performing supervised learning in certain scenarios can be difficult and/or expensive, if not impossible.

SUMMARY

Aspects and advantages of embodiments of the present disclosure will be set forth in part in the following description, or can be learned from the description, or can be learned through practice of the embodiments.

One example aspect of the present disclosure is directed to a computer system to perform unsupervised machine learning. The computer system includes one or more processors and one or more non-transitory computer-readable media that store instructions. When executed by the one or more processors, the instructions cause the computer system to input a first state representation associated with a first time and a second state representation associated with a second time that is different than the first time into a temporal difference model. When executed by the one or more processors, the instructions cause the computer system to receive a temporal difference representation that encodes changes between the first state representation and the second state representation as an output of the temporal difference model. When executed by the one or more processors, the instructions cause the computer system to input the temporal difference representation and the first state representation associated with the first time into a prediction model. When executed by the one or more processors, the instructions cause the computer system to receive a prediction of the second state representation as an output of the prediction model. When executed by the one or more processors, the instructions cause the computer system to determine a loss value that represents a difference between the second state representation and the prediction of the second state representation. When executed by the one or more processors, the instructions cause the computer system to train at least the temporal difference model based at least in part on the loss value.

Another example aspect of the present disclosure is directed to a computer-implemented method to perform unsupervised machine learning. The method includes obtaining, by one or more computing devices, a first state representation associated with a first time and a second state representation associated with a second time that is subsequent to the first time. The method includes inputting, by the one or more computing devices, the first state representation and the second state representation into a temporal difference model. The method includes receiving, by the one or more computing devices as an output of the temporal difference model, a temporal difference representation that encodes changes between the first state representation and the second state representation. The method includes inputting, by the one or more computing devices, the temporal difference representation and the first state representation associated with the first time into a prediction model. The method includes receiving, by the one or more computing devices, a prediction of the second state representation as an output of the prediction model. The method includes determining, by the one or more computing devices, a loss value that represents a difference between the second state representation and the prediction of the second state representation. The method includes training, by the one or more computing devices, at least the temporal difference model based at least in part on the loss value.

Another example aspect of the present disclosure is directed to a computing system. The computing system includes at least one processor and at least one memory that stores a machine-learned temporal difference model. The machine-learned temporal difference model is configured to receive a first state representation associated with a first time and a second state representation associated with a second time that is subsequent to the first time; and output a temporal difference representation that encodes changes between the first state representation and the second state representation. The temporal difference model has been trained by sequentially backpropagating a loss value through a prediction model and then through the temporal difference model. The prediction model is configured to receive the first state representation and the temporal difference representation and to output a prediction of the second state representation. The loss value is descriptive of a difference between the second state representation and the prediction of the second state representation.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 depicts a block diagram of an example temporal difference model according to example embodiments of the present disclosure.

FIG. 3 depicts a block diagram of an example unsupervised training scheme according to example embodiments of the present disclosure.

FIG. 4 depicts a block diagram of an example unsupervised training scheme according to example embodiments of the present disclosure.

FIG. 5 depicts a block diagram of an example semi-supervised training scheme according to example embodiments of the present disclosure.

Figure 1A:
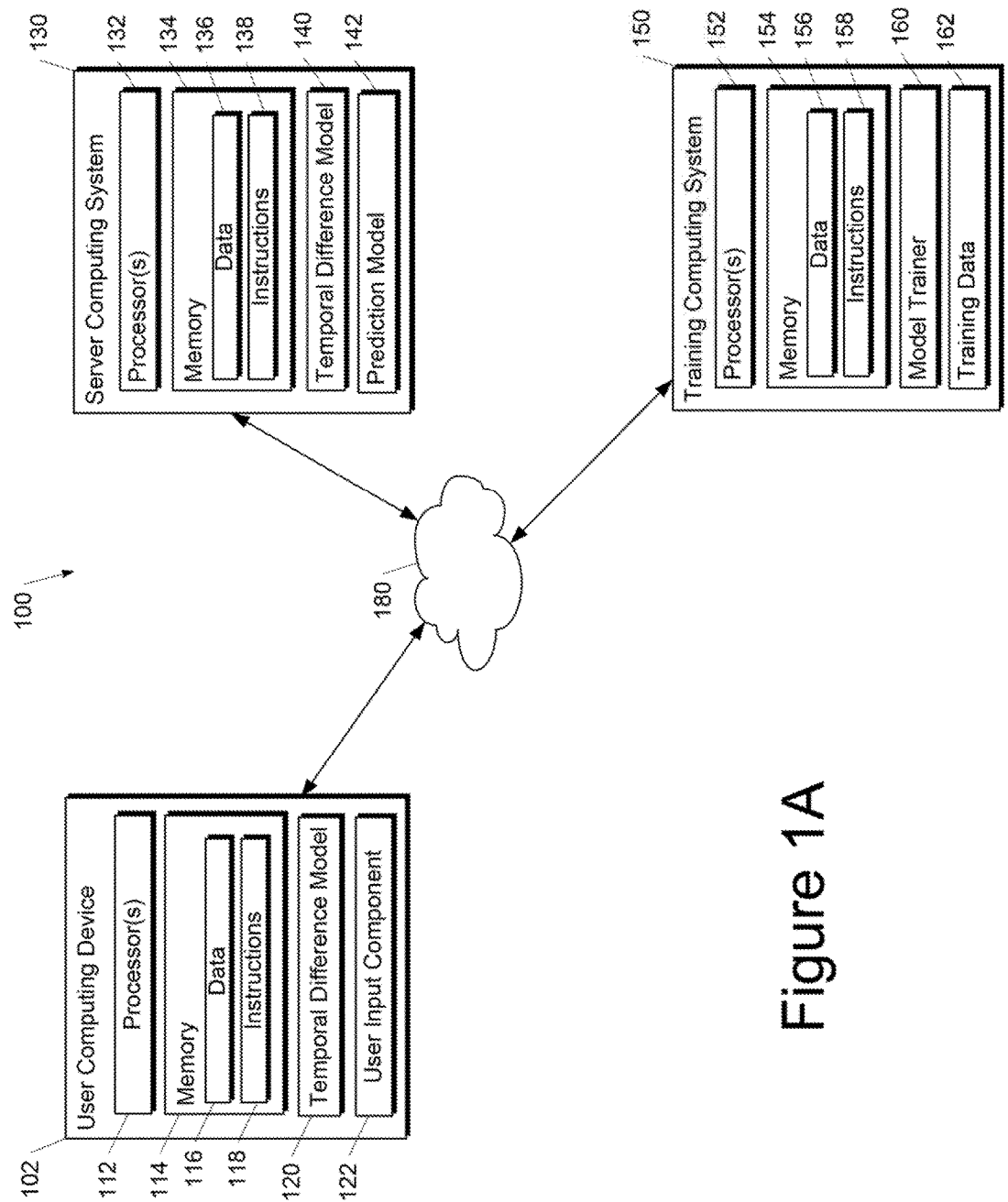
FIG. 1A depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to unsupervised learning techniques for temporal difference models and to applications of such temporal difference models once trained. In particular, according to an aspect of the present disclosure, a temporal difference model can be trained to receive at least a first state representation and a second state representation that respectively describe a state of an object at two different times and, in response, output a temporal difference representation that encodes or otherwise describes changes in the object between the two different times. One example use for such a temporal difference model is to provide temporal difference representations that relate to actions depicted by videos. According to another aspect, the present disclosure provides a scheme and technique that enables unsupervised training of the temporal difference model. In particular, the temporal difference model can be combined with a prediction model that, given the temporal difference representation and the first state representation, seeks to predict or otherwise reconstruct the second state representation. The temporal difference model can be trained on a loss value that represents a difference between the second state representation and the prediction of the second state representation. For example, the loss value can be backpropagated through the prediction model and then through the temporal difference model. In such fashion, unlabeled data can be used to train the temporal difference model to provide the temporal difference representation. Thus, the present disclosure provides unsupervised learning techniques for temporal difference models and further provides example uses for such temporal difference models once trained More particularly, a temporal difference model of the present disclosure can receive a first state representation associated with a first time and a second state representation associated with a second time that is different than the first time. For example, the second time can be subsequent to the first time.

The first and second state representations can respectively describe a respective state of an object at the first and second times. For example, the state of the object can be described by a sequence of data and the first and second state representations can be portions of such sequence of data or can be derived from portions of such sequence of data.

In response to receipt of the first and the second state representations, the temporal difference model can output a temporal difference representation that encodes changes between the first state representation and the second state representation. Stated differently, the temporal difference representation can describe how the state of the object changed between the first time and the second time. In one example conceptualization of this principle, state representations might be conceptualized as nouns that describe the state of the object while the temporal difference representation might be conceptualized as verbs (e.g., actions) that transform the state of the object.

In some instances, the temporal difference representation can be referred to as a temporal difference encoding. For example, a temporal difference encoding can be expressed in fewer dimensions than its corresponding state representations. In some instances, the temporal difference representation can be referred to as a temporal difference embedding. For example, a temporal difference embedding can (but is not required to) be obtained from an embedding layer (e.g., a close to final, but not final, layer) of the temporal difference model.

In some implementations, the temporal difference model can include one or more neural networks (e.g., deep neural networks) or other non-linear models. Neural networks can include feed forward neural networks, convolutional neural networks, recurrent neural networks, or other forms of neural networks. Alternatively or additionally, the temporal difference model can include other forms of machine-learned models. For example, the temporal difference model can include one or more Restricted Boltzmann Machines, Random Decision Forests, or other models, including linear models.

In one particular example that will be continued throughout the present disclosure, the object can be a video or other collection of images that depict a scene, and the first and second state representations can respectively describe first and second frames included the video or image collection. As one example, the first and second state representations can respectively be the raw image data (e.g., RGB values) of the first and second frames of the video. As another example, the first and second state representations can respectively be higher-level descriptions of the first and second frames. For example, each of the first and second frames can be input into a machine-learned image classification model (e.g., deep neural network). The image classification model can provide, for each input frame, an image embedding that describes the frame (e.g., identifies objects included in the frame or otherwise relates to semantic descriptions of the depicted scene). The respective image embeddings for the first and second frames can be used as the first and second state representations.

Thus, in some implementations, the raw frames can be processed in some way to obtain higher-level (e.g., more humanly-understandable) representations of the frames which can be used as the state representations. Use of higher-level state representations causes the resulting temporal difference representation to also be a higher-level representation. For example, if the first and second state representations relate to semantic descriptions of the scene depicted by the first and second frames, then the temporal difference representation might be related to or otherwise descriptive of a semantic representation of an action depicted by the video (e.g., "diving"). Thus, the temporal difference representation might be expressed in the same or a closely related feature space or dimensional space as the state representations.

As an example, in the instance in which the object is a video that depicts a scene and the first and second state representations are image embeddings for first and second frames of the video, the temporal difference representation can describe an action taking place in the scene depicted by the video. For example, for a video that depicts a man diving into a pool, the frame embeddings might relate to the semantic terms of "man" and "swimming pool" while the resultant temporal difference representation might relate to the action of "diving."

A temporal difference representation that describes an action depicted by the video can be useful for many objectives, including, for example, identifying related videos that depict the same action. For example, the temporal difference representation for a first video can be compared to other temporal difference representations determined for other videos to determine a measure of relatedness. In particular, certain existing products use related embeddings for objects to encode which objects are in a video. However, prior to the present disclosure, an analogue for actions did not exist. In some implementations, a relatedness between temporal difference representations can be determined by calculating a Euclidean distance between the temporal difference representation vectors.

In another example, temporal difference representations that describe actions can also be useful to disambiguate videos based on action. For example, a first video where someone sits in front of a frying pan full of food and a second video where someone actively cooks with a frying pan can be disambiguated through a comparison of their respective temporal difference representations.

The video frame example provided above is only one example application. In other example applications, the object can include an audio file, an environment, a mechanized or computerized system, or any other object or system. For example, the state of an environment or a mechanized and/or computerized system over time can be represented by a sequence of sensor data. Thus, the temporal difference models of the present disclosure can be applied to provide temporal difference representations for many different objects and system, of which a video is one non-limiting example.

In addition, in some implementations, the state representation for each of the first and second times can be multi-modal in nature. As an example, if the state of an object (e.g., a video) at a first time can be described by both audio data and image data, then a first state representation for the first time can include both audio data and image data associated with the first time. Likewise, a second state representation for the object can also include audio data and image data associated with a second time. Thus, a state representation of an object for a particular time can include plural channels, types, or modes of data or information.

According to another aspect, the present disclosure provides a scheme and technique that enables unsupervised training of temporal difference models. In particular, the temporal difference model can be combined with a prediction model. As described above, the temporal difference model can receive a first state representation and a second state representation associated with different times and, in response, output the temporal difference representation. To perform the unsupervised training, the temporal difference representation and the first state representation can be input into the prediction model. In response, the prediction model can output a prediction of the second state representation.

A loss value can represent a difference between the second state representation and the prediction of the second state representation. For example, the loss value can be obtained by evaluating a loss function. For example, evaluating the loss function can include inputting the second state representation and the prediction of the second state representation into the loss function. The temporal difference model and the prediction model can be trained based at least in part on the loss value. For example, the loss value can be backpropagated through the prediction model and then through the temporal difference model.

In such fashion, the prediction model can be trained to accurately predict the second state representation given the first state representation and knowledge of how the state is changing. Likewise, the temporal difference model can be trained to provide a temporal difference representation that sufficiently describes how the state of the object is changing so as to enable the prediction model to accurately predict the second state representation given knowledge of the first state representation. Stated differently, the temporal difference model can be trained to provide a temporal difference representation that encodes changes in the state of an object (e.g., actions) rather than the state of the object itself.

In some implementations, the prediction model can be or can otherwise include various machine-learned models such as neural networks (e.g., deep recurrent neural networks) or other multi-layer non-linear models. Alternatively or additionally, the prediction model can include other forms of machine-learned models. For example, the prediction model can include one or more Restricted Boltzmann Machines, Random Decision Forests, or other models, including linear models.

The training scheme and technique described above do not require labeled data that has explicit labels that identify the corresponding changes (e.g., actions) associated with the object (e.g., video) and, therefore, operate in an unsupervised fashion. Thus, one technical benefit of the present disclosure is the ability to train the temporal difference model on unsupervised data. In many scenarios, unsupervised data is preferable to supervised data because supervised data is very expensive to obtain and limited in scope.

On the other hand, unsupervised data such as, for example, raw video data, audio data, or sensor data, is very plentiful.

Another beneficial aspect of the training techniques and temporal difference models described herein is that they make no assumptions about the form of the first and second state representations that are provided as input and, therefore can be flexibly and easily applied to many different data types and use cases. While representations of image frames have been used as an example, other possible state representations can include embeddings of multiple frames, spatial information, audio, photo sequences, clicks on ads or other user data, changes in a mobile computing device's inertial measurement unit, or even other temporal difference representations. This last example highlights that the temporal difference model can be used over a variety of time spans.

Another beneficial aspect of the temporal difference model is a byproduct of being trained in an unsupervised manner: the model learns about the temporal sequence instead of just a few labels. When labeled data is plentiful, unsupervised learning is not necessarily superior to supervised learning. However, when labels are difficult to obtain, unsupervised learning can produce competitive or superior results that transfer better across problems.

In particular, the primary alternative to the unsupervised techniques described herein is to use supervised learning. Supervised learning requires collecting labels for thousands or millions of data examples, which is prohibitively expensive for most use scenarios and implementing entities.

Additionally, in cases where it is desired for the temporal difference representation to relate to semantic descriptions of actions or other changes, collecting labeled data to train a model to provide such representations requires defining a certain vocabulary of defined actions or changes, which itself is a perplexing problem. Further, during training on such labeled data, the temporal difference model will learn to provide only representations that are related to the predefined vocabulary, which is likely limited in nature. As a result, a new, large data set must be collected for each instance in which a new action or change (e.g., a new word in the "vocabulary" of the model) needs to be recognized, compounding the prohibitively expensive cost of supervised data collection. These limitations of labeled data can be wholly bypassed through use of the unsupervised techniques present disclosure.

In particular, temporal difference models trained according to the unsupervised technique of the present disclosure are able to learn to provide temporal difference representations that describe any number of different and, in some cases, unknown changes or actions of any duration. For example, temporal difference representations from temporal difference models that were trained in an unsupervised fashion can be used to identify changes or actions that were not previously known to be of interest when the training data was collected. Stated differently, the unsupervised techniques of the present disclosure enable an understanding of temporal dynamics that were not anticipated when the data was collected. This solves a meaningful problem because, as described above, humans typically do not agree on either the list/vocabulary of possible actions in the world or when a given action starts or stops. By learning a general purpose representation across unlabeled videos, the temporal difference models of the present disclosure can incorporate more knowledge into the system than can be rated by humans.

Other alternatives to the present disclosure include unsupervised approaches that do not focus on temporal differences. These other approaches are inferior because they confound the state of the object (e.g., the objects and background images depicted by a video) with the changes in the state of the object over time (e.g., the action depicted by the video).

By contrast, the unsupervised training schemes and techniques of the present disclosure avoid such confounding by explicitly providing one of the state representations in parallel with the temporal difference representation for use by the prediction model. This causes the temporal difference representation to be complementary to the first state representation, which should provide information about the state of the object (e.g., encode which objects are present in the scene). As a result, the models of the present disclosure avoid confounding the information included in the state representations with the changes described by the temporal difference representation.

In addition, once the temporal difference model produces the temporal difference representation, the temporal difference representation carries a large amount of knowledge. For some tasks, such as, for example, video similarity or relatedness, the temporal difference representation can be used directly. For other tasks, such as, for example, video classification, an additional classification model can be trained on top of the temporal difference representation using a very small amount of training data.

More particularly, according to another aspect of the present disclosure, where some set of labeled data is available, it is easy to extend the unsupervised techniques described herein to be semi-supervised by introducing the labeled data for training an additional classification model and/or the temporal difference model. As an example, in some implementations, an additional classification model can branch off from the temporal difference representation and can provide a classification for the object. In some implementations, the classification model can also receive the first state representation, while in other implementations the classification model can operate without receiving the first state representation.

Thus, the classification model can be trained to output a classification for the object in response to receipt of the temporal difference representation (and optionally the first state representation as well). When at least some amount of labeled training data is available (e.g., data that includes labels providing ground-truth classifications for certain objects), a second loss value can be defined that represents a difference between the classification output by the classification model for a given object and the label for such object. For example, the second loss value can be obtained by evaluating a second loss function. The classification model can be trained based at least in part on the second loss value. For example, the second loss value can be backpropagated through the classification model to train the classification model. Thus, an additional classification model can be trained to provide a classification of an object based at least in part on a temporal difference representation determined for such object.

The training of the classification model as described above allows the general knowledge captured by the temporal difference model to be extended to the classification model. In particular, the additional classification model can be trained on top of the temporal difference representation using a very small amount of specific training data. As such, in some implementations, the temporal difference model can be offered as a service to a third party entity that wishes to train a classification model on a small amount of training data specifically designed to enable detection of a specific class of change or action.

In addition, in some implementations, the temporal difference model can also be trained based at least in part on the second loss value. For example, in some implementations, after backpropagating the second loss value through the classification model, the training system can continue to further backpropagate the second loss value through the temporal difference model. This semi-supervised learning ensures the temporal difference model learns useful features that take advantage of any available labeled classification data.

According to additional aspects of the present disclosure, many novel uses exist for the temporal difference models of the present disclosure. As described above, temporal difference representations can be used to identify related videos or other objects and/or to obtain a classification for videos or other objects.

In another example use, temporal difference representations can be useful for identifying highlights within a video or other image collection. For example, a classification model can be trained as described above on labeled data that includes portions of videos that have been labeled as highlights. In such fashion, the classification model can be trained to identify highlights based on their temporal difference representations. Detected highlight images can be used to create a highlight reel and/or can be suggested as an ideal thumbnail for a video or image collection.

In another example, temporal difference representations can be useful for identifying and automatically suggesting image album boundaries or transitions. For example, a temporal difference embedding can be determined for each pair of consecutive images in a collection. When one of the temporal difference representations indicates a significant transition in depicted actions, a potential boundary for the image album can be detected. For example, a spike in temporal difference representation values or a spike in an iteration-over-iteration change in representation values can indicate a potential boundary for the image album that can be suggested to the user.

As another example, temporal difference representations can be used to select and/or create training data for training a classification model for a specific image search. For example, by identifying changes in videos, an image classification model can also be trained to identify frames where change occurs. As an example, it is notoriously difficult to identify pictures where a baseball batter hits a baseball, because the baseball corresponds to only a few pixels. However, these images can be distinguished by looking at a corresponding temporal difference representation. In one example, input of imagery and audio data from respective times before and after the hit can be input into the temporal difference model to receive a temporal difference representation that corresponds to the baseball batter hitting the ball. In another example, a baseball hit can be found using only temporal differences across images since the images after a hit (e.g. the batter running to first base, the ball flying through the air) are different than the images following a miss (e.g., the catcher throwing the ball back to the pitcher). Using the temporal difference representation to select training data increases the amount of available data and also increases the ability of a classification model to find photos of a batter hitting the ball.

As yet another example, the temporal difference models of the present disclosure can be used to perform event detection, anomaly detection and/or fault detection in a system. For example, a computer system can monitor for temporal difference representations that are related to previously-observed temporal difference representations associated with previous system faults or other types of events. As another example, never-before-seen temporal difference representations can be identified that correspond to novel changes or other anomalies occurring in the system.

As another example, temporal difference representations can be viewed as compressions or encodings. For example, representations of change can be viewed as an update step for the future and the trained prediction model can be used to obtain predictions of future object states.

In another example, a temporal difference representation can be used to select which of several possible compression techniques should be used to compress a data set. For example, knowledge of how the data set is changing can be used to identify which of the possible compression techniques will provide the most compression gains.

In some implementations, the systems and methods of the present disclosure can be included or otherwise employed within the context of an application, a program, a browser plug-in, or in other contexts. Thus, in some implementations, the temporal difference models of the present disclosure can be included in or otherwise stored and implemented by a user computing device such as a laptop, tablet, or smartphone. As yet another example, the temporal difference models can be included in or otherwise stored and implemented by a server computing device that communicates with the user computing device according to a client-server relationship. For example, the temporal difference models can be implemented by the server computing device as a portion of a web service (e.g., a video search service).

With reference now to the Figures, example embodiments of the present disclosure will be discussed in further detail.

Example Devices and Systems

FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more temporal difference models 120. For example, the temporal difference models 120 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, or other forms of neural networks. Alternatively or additionally, the temporal difference models 120 can include other forms of machine-learned models. For example, the temporal difference models 120 can include one or more Restricted Boltzmann Machines, Random Decision Forests, or other models, including linear models. Example temporal difference models 120 and training schemes therefor are discussed with reference to FIGS. 2-6.

In some implementations, the one or more temporal difference models 120 can be received from the server computing system 130 over network 180, stored in the user computing device memory 114, and the used or otherwise implemented by the one or more processors 112. In some implementations, the user computing device 102 can implement multiple parallel instances of a temporal difference model 120 (e.g., to perform multiple parallel instances of temporal difference prediction).

Additionally or alternatively, one or more temporal difference models 140 can be included in or otherwise stored and implemented by the server computing system 130 that communicates with the user computing device 102 according to a client-server relationship. For example, the temporal difference models 140 can be implemented by the server computing system 140 as a portion of a web service (e.g., a video search service). Thus, one or more models 120 can be stored and implemented at the user computing device 102 and/or one or more models 140 can be stored and implemented at the server computing system 130.

The user computing device 102 can also include one or more user input components 122 that receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, a traditional mouse, or other components by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise includes one or more machine-learned temporal difference models 140. For example, the temporal difference models 140 can be or can otherwise include various machine-learned models such as neural networks (e.g., deep recurrent neural networks) or other multi-layer non-linear models. Alternatively or additionally, the temporal difference models 140 can include other forms of machine-learned models. For example, the temporal difference models 140 can include one or more Restricted Boltzmann Machines, Random Decision Forests, or other models, including linear models. Example temporal difference models 140 and training schemes therefor are discussed with reference to FIGS. 2-6.

The server computing system 130 can also include a prediction model 142. For example, the prediction model 142 can be or can otherwise include various machine-learned models such as neural networks (e.g., deep recurrent neural networks) or other multi-layer non-linear models. Alternatively or additionally, the prediction model 142 can include other forms of machine-learned models. For example, the prediction model 142 can include one or more Restricted Boltzmann Machines, Random Decision Forests, or other models, including linear models. Example prediction models 142 and training schemes therefor are discussed with reference to FIGS. 3-6.

The server computing system 130 can train the temporal difference models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120/140 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train a temporal difference model 120/140 based on a set of training data 162. In some implementations, unsupervised training techniques can be used on a set of training data 162 that is unlabeled. For example, unsupervised training schemes are discussed with reference to FIGS. 3-6. In some implementations, the set of training data 162 can include raw video data, audio data, or sensor data.

In some implementations, if the user has provided consent, the training examples can be provided by the user computing device 102. Thus, in such implementations, the model 120/140 provided to or used for the user computing device 102 can be trained by the training computing system 150 on user-specific data received from the user computing device 102. In some instances, this process can be referred to as personalizing the model. In addition, as described with reference to FIGS. 5-6, a specific classification model can be trained as well.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the temporal difference models 120 can be both trained and used locally at the user computing device 102. In some of such implementations, the user computing device 102 can implement the model trainer 160 to personalize the temporal difference models 120 based on user-specific data.

Figure 1B:
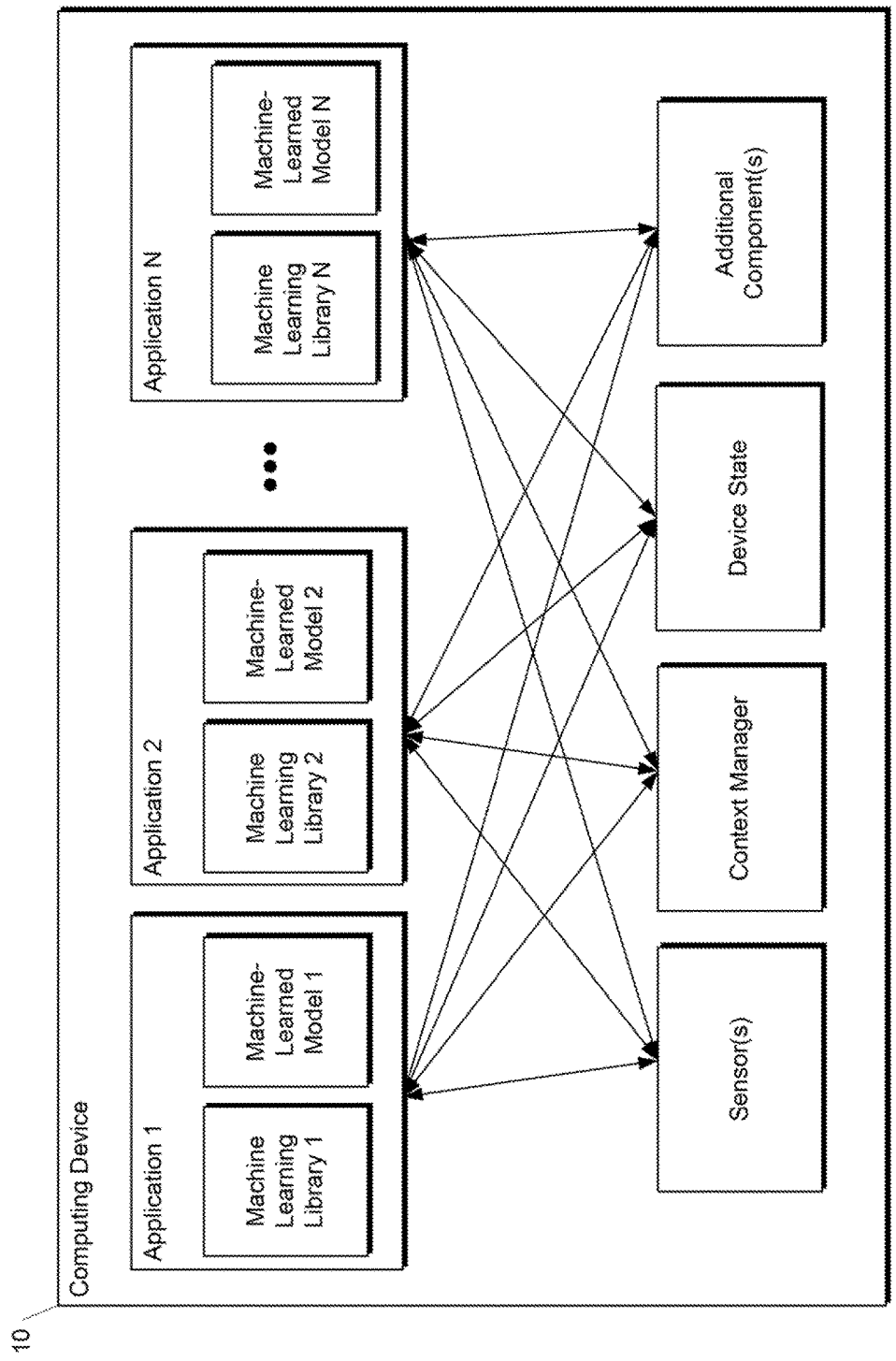
FIG. 1B depicts a block diagram of an example computing device according to example embodiments of the present disclosure.

FIG. 1B depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned temporal difference model. Example applications include an application that includes image and/or video search functionality, an image collection and management application, an event detection application, a compression application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
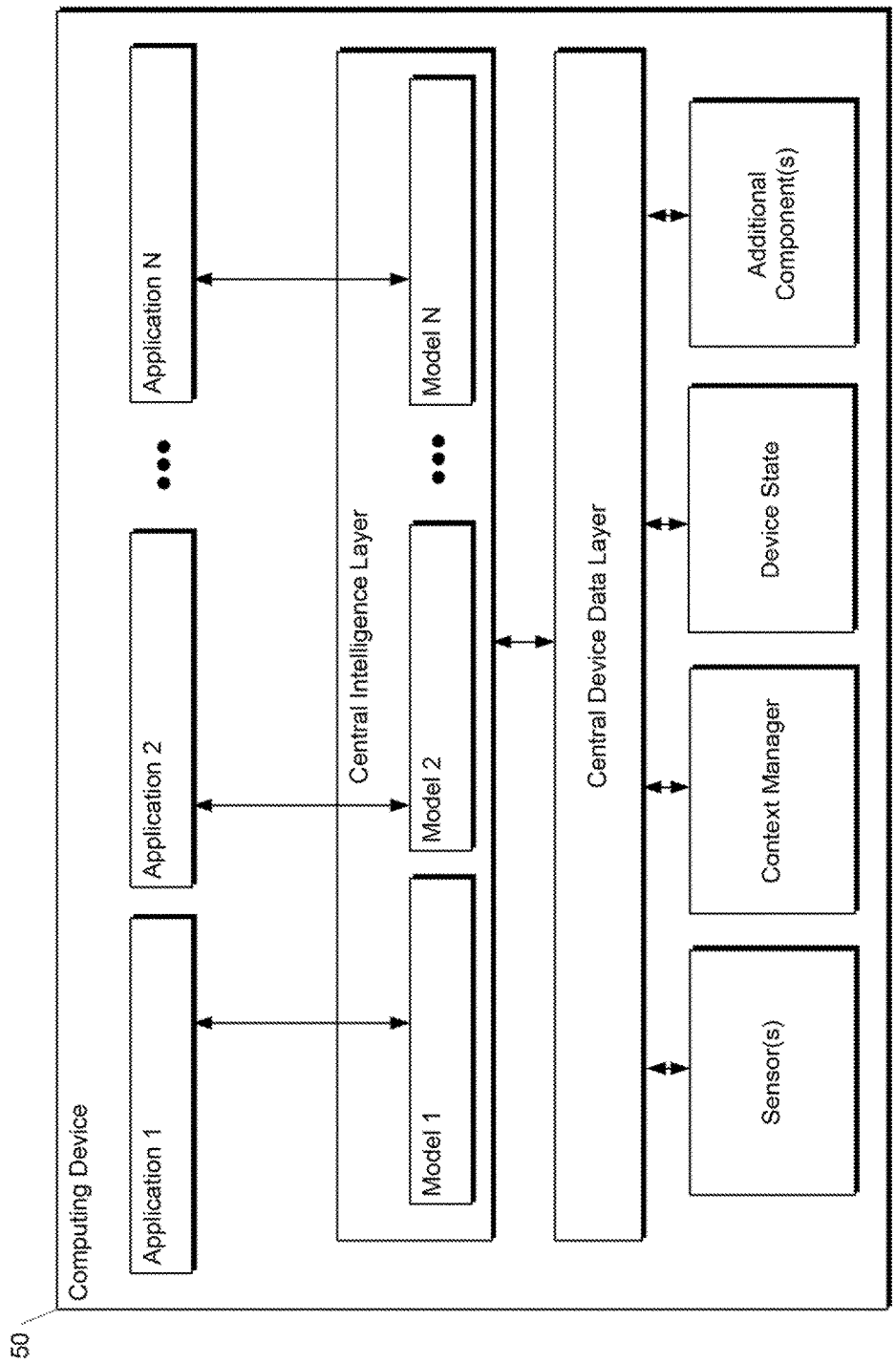
FIG. 1C depicts a block diagram of an example computing device according to example embodiments of the present disclosure.

FIG. 1C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include an application that includes image and/or video search functionality, an image collection and management application, an event detection application, a compression application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a temporal difference model) can be provided for each application and managed by the central intelligence layer. In other implementations, two or more applications can share a single machine-learned model. For example, in some implementations, the central intelligence layer can provide a single model (e.g., a single temporal difference model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements and Training Schemes

FIG. 2 depicts a block diagram of an example temporal difference model 202 according to example embodiments of the present disclosure. The temporal difference model 202 can receive a first state representation 204 associated with a first time and a second state representation 205 associated with a second time that is different than the first time. For example, the second time can be subsequent to the first time.

The first and second state representations 204 and 205 can respectively describe a respective state of an object at the first and second times. For example, the state of the object can be described by a sequence of data and the first and second state representations 204 and 205 can be portions of such sequence of data or can be derived from portions of such sequence of data.

In response to receipt of the first and the second state representations 204 and 205, the temporal difference model 202 can output a temporal difference representation 206 that encodes changes between the first state representation 204 and the second state representation 205. Stated differently, the temporal difference representation 206 can describe how the state of the object changed between the first time and the second time. In one example conceptualization of this principle, state representations 204 and 205 might be conceptualized as nouns that describe the state of the object while the temporal difference representation 206 might be conceptualized as verbs (e.g., actions) that transform the state of the object.

In some instances, the temporal difference representation 206 can be referred to as a temporal difference encoding. For example, a temporal difference encoding can be expressed in fewer dimensions than its corresponding state representations 204 and 205. In some instances, the temporal difference representation 206 can be referred to as a temporal difference embedding. For example, a temporal difference embedding can (but is not required to) be obtained from an embedding layer (e.g., a close to final, but not final, layer) of the temporal difference model.

In some implementations, the temporal difference model 202 can include one or more neural networks (e.g., deep neural networks) or other non-linear models. Neural networks can include feed forward neural networks, convolutional neural networks, recurrent neural networks, or other forms of neural networks. Alternatively or additionally, the temporal difference model 202 can include other forms of machine-learned models. For example, the temporal difference models 202 can include one or more Restricted Boltzmann Machines, Random Decision Forests, or other models, including linear models.

In one particular example that will be continued throughout the present disclosure, the object can be a video or other collection of images that depict a scene, and the first and second state representations 204 and 205 can respectively describe first and second frames included the video or image collection.

As one example, the first and second state representations 204 and 205 can respectively be the raw image data (e.g., RGB values) of the first and second frames of the video. As another example, the first and second state representations 204 and 205 can respectively be higher-level descriptions of the first and second frames. For example, each of the first and second frames can be input into a machine-learned image classification model (e.g., deep neural network). The image classification model can provide, for each input frame, an image embedding that describes the frame (e.g., identifies objects included in the frame or otherwise relates to semantic descriptions of the depicted scene). The respective image embeddings for the first and second frames can be used as the first and second state representations 204 and 205.

Thus, in some implementations, the raw frames can be processed in some way to obtain higher-level (e.g., more humanly-understandable) representations of the frames which can be used as the state representations 204 and 205. Use of higher-level state representations causes the resulting temporal difference representation 206 to also be a higher-level representation. For example, if the first and second state representations 204 and 205 relate to semantic descriptions of the scene depicted by the first and second frames, then the temporal difference representation 206 might be related to or otherwise descriptive of a semantic representation of an action depicted by the video (e.g., "diving"). Thus, the temporal difference representation 206 might be expressed in the same or a closely related feature space or dimensional space as the state representations 204 and 205.

As an example, in the instance in which the object is a video that depicts a scene and the first and second state representations 204 and 205 are image embeddings for first and second frames of the video, the temporal difference representation 206 can describe an action taking place in the scene depicted by the video. For example, for a video that depicts a man diving into a pool, the frame embeddings might relate to the semantic terms of "man" and "swimming pool" while the resultant temporal difference representation 206 might relate to the action of "diving."

A temporal difference representation 206 that describes an action depicted by the video can be useful for many objectives, including, for example, identifying related videos that depict the same action. For example, the temporal difference representation 206 for a first video can be compared to other temporal difference representations 206 determined for other videos to determine a measure of relatedness. In particular, certain existing products use related embeddings for objects to encode which objects are in a video. However, prior to the present disclosure, an analogue for actions did not exist. In some implementations, a relatedness between temporal difference representations 206 can be determined by calculating a Euclidian distance between the temporal difference representation vectors.

In another example, temporal difference representations 206 that describe actions can also be useful to disambiguate videos based on action. For example, a first video where someone sits in front of a frying pan full of food and a second video where someone actively cooks with a frying pan can be disambiguated through a comparison of their respective temporal difference representations 206.

The video frame example provided above is only one example application. In other example applications, the object can include an audio file, an environment, a mechanized or computerized system, or any other object or system. For example, the state of an environment or a mechanized and/or computerized system over time can be represented by a sequence of sensor data. Thus, the temporal difference models 202 of the present disclosure can be applied to provide temporal difference representations 206 for many different objects and system, of which a video is one non-limiting example. Many additional uses exist for a trained temporal difference model 202, and at least some of such uses have been described above in the overview section.

In addition, in some implementations, the state representations 204 and 205 can be multi-modal in nature. As an example, the first state representation 204 can include both a first mode of data (e.g., image data) and a second mode of data (e.g., audio data) that describe the state of the object at the first time. Likewise, the second state representation 205 can include both the first mode of data (e.g., image data) and the second mode of data (e.g., audio data) that describe the state of the object at the second time. Image data and audio data are provided as example modes of data or information only. Many different modes of data or information exist and can be used as state representations.

FIG. 3 depicts a block diagram of an example unsupervised training scheme according to example embodiments of the present disclosure. In particular, in the illustrated unsupervised training scheme, the temporal difference model 202 can be combined with a prediction model 302. As described above, the temporal difference model 202 can receive a first state representation 204 and a second state representation 205 associated with different times and, in response, output the temporal difference representation 206.

To perform the unsupervised training, the temporal difference representation 206 and the first state representation 204 can be input into the prediction model 302. In response, the prediction model 302 can output a prediction 304 of the second state representation.

A loss value can represent a difference between the second state representation 205 and the prediction 304 of the second state representation. In particular, as an example, FIG. 4 depicts a block diagram of an example unsupervised training scheme in which a loss function 402 evaluates a difference between the second state representation 205 and the prediction 304 of the second state representation to provide the loss value.

The temporal difference model 202 and/or the prediction model 302 can be trained based at least in part on a loss value provided by the loss function 402. For example, the loss value provided by the loss function 402 can be backpropagated through the prediction model 302 and then through the temporal difference model 202.

In such fashion, the prediction model 302 can be trained to accurately predict the second state representation 205 given the first state representation 204 and knowledge of how the state is changing. Likewise, the temporal difference model 202 can be trained to provide a temporal difference representation 206 that sufficiently describes how the state of the object is changing so as to enable the prediction model 302 to accurately predict the second state representation 205 given knowledge of the first state representation 204. Stated differently, the temporal difference model 202 can be trained to provide a temporal difference representation 206 that encodes changes in the state of an object (e.g., actions) rather than the state of the object itself.

The training scheme and technique described above do not require labeled data that has explicit labels that identify the corresponding changes (e.g., actions) associated with the object (e.g., video) and, therefore, operate in an unsupervised fashion. Thus, one technical benefit of the present disclosure is the ability to train the temporal difference model 202 on unsupervised data. In many scenarios, unsupervised data is preferable to supervised data because supervised data is very expensive to obtain and limited in scope. On the other hand, unsupervised data such as, for example, raw video data, audio data, or sensor data, is very plentiful.

FIG. 5 depicts a block diagram of an example semi-supervised training scheme according to example embodiments of the present disclosure. More particularly, once the temporal difference model 202 produces the temporal difference representation 206, the temporal difference representation 206 carries a large amount of knowledge. For some tasks, such as, for example, video similarity or relatedness, the temporal difference representation 206 can be used directly. For other tasks, such as, for example, video classification, an additional classification model 502 can be trained on top of the temporal difference representation 206 using a very small amount of training data.

More particularly, according to another aspect of the present disclosure, where some set of labeled data is available, it is easy to extend the unsupervised techniques described in FIGS. 3-4 to be semi-supervised by introducing the labeled data for training an additional classification model 502 and/or the temporal difference model 202.

As an example, as illustrated in FIG. 5, an additional classification model 502 can branch off from the temporal difference representation 206 and can provide a classification 504 for the object. In some implementations, the classification model 502 can also receive the first state representation 204, while in other implementations the classification model 502 can operate without receiving the first state representation 204.

Thus, the classification model 502 can be trained to output a classification 504 for the object in response to receipt of the temporal difference representation 206 (and optionally the first state representation 204 as well). When at least some amount of labeled training data is available (e.g., data that includes labels providing ground-truth classifications for certain objects), a second loss value can be defined that represents a difference between the classification 504 output by the classification model 502 for a given object and the label for such object.

Figure 6:
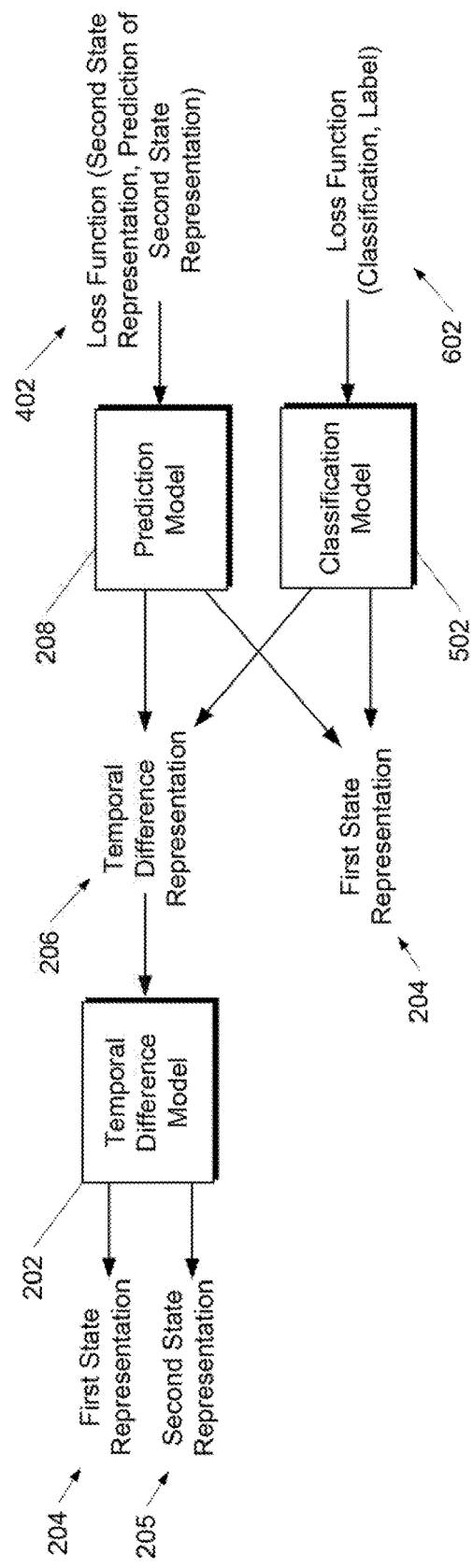
FIG. 6 depicts a block diagram of an example semi-supervised training scheme according to example embodiments of the present disclosure.

In particular, as an example, FIG. 6 depicts a block diagram of an example semi-training scheme in which a second loss function 602 evaluates a difference between the classification 504 for an object and a label that is provided for such object.

The classification model 502 can be trained based at least in part on a second loss value provided by the second loss function 602. For example, the second loss value provided by the second loss function 602 can be backpropagated through the classification model 502 to train the classification model 502. Thus, an additional classification model 502 can be trained to provide a classification 504 of an object based at least in part on a temporal difference representation 206 determined for such object.

The training of the classification model 502 as described above allows the general knowledge captured by the temporal difference model 202 to be extended to the classification model 502. In particular, the additional classification model 502 can be trained on top of the temporal difference representation 206 using a very small amount of specific training data. As such, in some implementations, the temporal difference model 202 can be offered as a service to a third party entity that wishes to train a classification model 502 on a small amount of training data specifically designed to enable detection of a specific class of change or action.

In addition, in some implementations, the temporal difference model 202 can also be trained based at least in part on the second loss value provided by the second loss function 602. For example, in some implementations, after backpropagating the second loss value provided by the second loss function 602 through the classification model 502, the training system can continue to further backpropagate the second loss value provided by the second loss function 602 through the temporal difference model 202. This semi-supervised learning ensures the temporal difference model 202 learns useful features that take advantage of any available labeled classification data.

Example Methods

Figure 7:
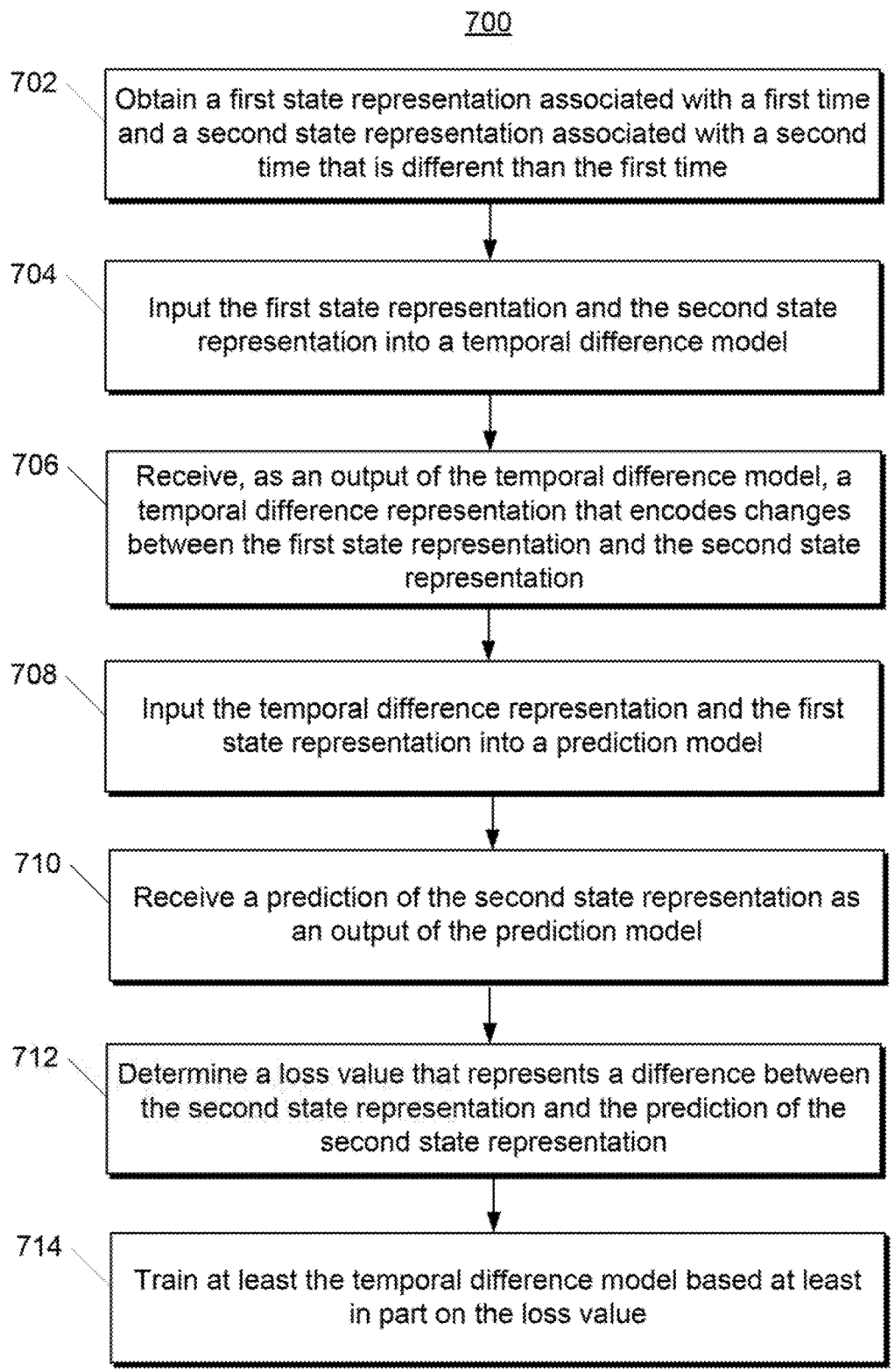
FIG. 7 depicts a flow chart diagram of an example method to perform unsupervised machine learning according to example embodiments of the present disclosure.

FIG. 7 depicts a flow chart diagram of an example method to perform temporal difference according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system obtains a first state representation associated with a first time and a second state representation associated with a second time that is different than the first time. For example, the second time can be subsequent to the first time.

In some implementations, the first state representation describes a first frame of a video associated with the first time while the second state representation describes a second frame of the video associated with the second time. As an example, the first state representation can be a first image embedding obtained by inputting the first frame of the video into a machine-learned image classification neural network; and the second state representation can be a second image embedding obtained by inputting the second frame of the video into the machine-learned image classification neural network.

In other implementations, the first state representation describes a first portion of an audio file and the second state representation describes a second portion of the audio file. In yet other implementations, the first state representation describes a first portion of a set of sensor data and the second state representation describes a second portion of the set of sensor data.

At 704, the computing system inputs the first state representation and the second state representation into a temporal difference model. In some implementations, the temporal difference model includes one or more neural networks (e.g., deep neural networks) or other machine-learned models. Neural networks can include feed-forward neural networks, recurrent neural networks, convolutional neural networks or other forms of neural networks. Alternatively or additionally, the temporal difference model can include other forms of machine-learned models. For example, the temporal difference model can include one or more Restricted Boltzmann Machines, Random Decision Forests, or other models, including linear models.

At 706, the computing system receives, as an output of the temporal difference model, a temporal difference representation that encodes changes between the first state representation and the second state representation. In some implementations, the temporal difference representation is a temporal difference embedding output at an embedding layer of the temporal difference model.

At 708, the computing system inputs the temporal difference representation and the first state representation into a prediction model. At 710, the computing system receives a prediction of the second state representation as an output of the prediction model.

At 712, the computing system determines a loss value that represents a difference between the second state representation and the prediction of the second state representation. At 714, the computing system trains at least the temporal difference model based at least in part on the loss value.

In some implementations, training at least the temporal difference model based at least in part on the loss value at 714 can include training at least the temporal difference model to minimize the loss value.

In some implementations, training at least the temporal difference model based at least in part on the loss value at 714 can include backpropagating the loss value through the prediction model and, after backpropagating the loss value through the prediction model, continuing to backpropagate the loss value through the temporal difference model.

In some implementations, the method 700 can further include: inputting at least the temporal difference representation into a classification model; receiving, as an output of the classification model, a classification of an object described by the first and the second state representations; determining a second loss value that represents a difference between the classification and a label associated with the object; and training at least the classification model based at least in part on the second loss value. In some further implementations, the method 700 can further include training the temporal difference model based at least in part on the second loss value.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer system to perform unsupervised machine learning, the computer system comprising:
one or more processors; and
one or more non-transitory computer-readable media that store instructions that, when executed by the one or more processors, cause the computer system to:
input a first state representation associated with a first time and a second state representation associated with a second time that is different than the first time into a temporal difference model;
generate a temporal difference representation that encodes changes between the first state representation and the second state representation, wherein the temporal difference representation is generated by the temporal difference model, using the first state representation and the second state representation;
receive the temporal difference representation as an output of the temporal difference model;
input the temporal difference representation and the first state representation associated with the first time into a prediction model;
generate a prediction of the second state representation, wherein the prediction of the second state representation is generated by the prediction model, using the temporal difference representation and the first state representation associated with the first time;
receive the prediction of the second state representation as an output of the prediction model;
determine a loss value that represents a difference between the second state representation and the prediction of the second state representation; and
train at least the temporal difference model based at least in part on the loss value.

2. The computer system of claim 1, wherein each of the temporal difference model and the prediction model comprises a deep neural network.

3. The computer system of claim 1, wherein the temporal difference representation comprises a temporal difference embedding output at an embedding layer of the temporal difference model.

4. The computer system of claim 1, wherein to train at least the temporal difference model based at least in part on the loss value, the computer system backpropagates the loss value through the prediction model and then through the temporal difference model.

5. The computer system of claim 1, wherein:
the first state representation describes a first frame of a video, the first frame associated with the first time; and
the second state representation describes a second frame of the video, the second frame associated with the second time that is different than the first time.

6. The computer system of claim 5, wherein:
the first state representation comprises a first image embedding obtained by inputting the first frame of the video into a machine-learned image classification neural network; and the second state representation comprises a second image embedding obtained by inputting the second frame of the video into the machine-learned image classification neural network.

7. The computer system of claim 1, wherein execution of the instructions further causes the computer system to:
   input at least the temporal difference representation into a classification model;
   receive a classification for an object described by the first and the second state representations as an output of the classification model;
   determine a second loss value that represents a second difference between the classification and a label associated with the object described by the first and the second state representations; and
   train at least the classification model based at least in part on the second loss value.

8. The computer system of claim 7, wherein execution of the instructions further causes the computer system to train the temporal difference model based at least in part on the second loss value.

9. The computer system of claim 7, wherein execution of the instructions further causes the computer system to input the first state representation into the classification model alongside the temporal difference representation.

10. The computer system of claim 1, wherein:
    the first state representation describes a first portion of an audio file, the first portion associated with the first time; and
    the second state representation describes a second portion of the audio file, the second portion associated with the second time that is different than the first time.

11. The computer system of claim 1, wherein:
    the first state representation describes a first portion of a set of sensor data, the first portion associated with the first time; and
    the second state representation describes a second portion of the set of sensor data, the second portion associated with the second time that is different than the first time.

12. A computer-implemented method to perform unsupervised machine learning, the method comprising:
    obtaining, by one or more computing devices, a first state representation associated with a first time and a second state representation associated with a second time that is subsequent to the first time;
    inputting, by the one or more computing devices, the first state representation and the second state representation into a temporal difference model;
    generating, by the one or more computing devices, a temporal difference representation that encodes changes between the first state representation and the second state representation, wherein the temporal difference representation is generated by the temporal difference model, using the first state representation and the second state representation;
    receiving, by the one or more computing devices as an output of the temporal difference model, a temporal difference representation that encodes changes between the first state representation and the second state representation;
    inputting, by the one or more computing devices, the temporal difference representation and the first state representation associated with the first time into a prediction model;
    generating, by the one or more computing devices, a prediction of the second state representation, wherein the prediction of the second state representation is generated by the prediction model, using the temporal difference representation and the first state representation associated with the first time;
    receiving, by the one or more computing devices, the prediction of the second state representation as an output of the prediction model;
    determining, by the one or more computing devices, a loss value that represents a difference between the second state representation and the prediction of the second state representation; and
    training, by the one or more computing devices, at least the temporal difference model based at least in part on the loss value.

13. The computer-implemented method of claim 12, wherein the temporal difference model comprises at least one deep neural network.

14. The computer-implemented method of claim 12, wherein training, by the one or more computing devices, at least the temporal difference model based at least in part on the loss value comprises training, by the one or more computing devices, at least the temporal difference model to minimize the loss value.

15. The computer-implemented method of claim 12, wherein training, by the one or more computing devices, at least the temporal difference model based at least in part on the loss value comprises:
    backpropagating, by the one or more computing devices, the loss value through the prediction model; and
    after backpropagating the loss value through the prediction model, continuing to backpropagate, by the one or more computing devices, the loss value through the temporal difference model.

16. The computer-implemented method of claim 12, further comprising:
    inputting, by the one or more computing devices, at least the temporal difference representation into a classification model;
    receiving, by the one or more computing devices as an output of the classification model, a classification of an object described by the first and the second state representations;
    determining, by the one or more computing devices, a second loss value that represents a difference between the classification and a label associated with the object; and
    training, by the one or more computing devices, at least the classification model based at least in part on the second loss value.

17. The computer-implemented method of claim 16, further comprising:
    training, by the one or more computing devices, the temporal difference model based at least in part on the second loss value.

18. A computing system, comprising:
    at least one processor; and
    at least one memory that stores a machine-learned temporal difference model that is configured to:
    receive a first state representation associated with a first time and a second state representation associated with a second time that is subsequent to the first time;
    generate a temporal difference representation that encodes changes between the first state representation and the second state representation, wherein the temporal difference representation is generated by the temporal difference model, using the first state representation and the second state representation; and output the temporal difference representation as an output of the temporal difference model, wherein the temporal difference model has been trained by sequentially backpropagating a loss value through a prediction model and then through the temporal difference model, the prediction model configured to receive the first state representation and the temporal difference representation and to output a prediction of the second state representation based on the first state representation and the temporal difference representation, the loss value descriptive of a difference between the second state representation and the prediction of the second state representation.

19. The computing system of claim 18, wherein:

the first state representation comprises a first image embedding obtained by inputting a first frame of a first video into a machine-learned image classification neural network;

the second state representation comprises a second image embedding obtained by inputting a second frame of the first video into the machine-learned image classification neural network;

the temporal difference representation describes an action depicted by the first video; and the at least one memory stores instructions that, when executed by the at least one processor, cause the computing system to respectively compare the temporal difference representation for the first video to a plurality of additional temporal difference representations respectively associated with a plurality of additional videos to identify at least one related video that is related to the first video.

20. The computing system of claim 18, wherein:

the first state representation comprises a first image embedding obtained by inputting a first image captured by a user into a machine-learned image classification neural network;

the second state representation comprises a second image embedding obtained by inputting a second image captured by the user into the machine-learned image classification neural network;

the temporal difference representation describes an action depicted by the first and the second images; and the at least one memory stores instructions that, when executed by the at least one processor, cause the computing system to respectively compare the temporal difference representation for the video to a plurality of additional temporal difference representations associated with a plurality of additional images captured by the user to identify at least one suggested album transition.

* * * * *